Dec. 13, 1966 F. HAUSER 3,291,922
SEQUENTIAL TIMING DEVICE WITH TIMING MOVEMENT
INDEPENDENT FROM POWER SHAFT
Filed Aug. 6, 1963 4 Sheets-Sheet 1

INVENTOR.
FRED HAUSER
BY
ATTORNEY

Dec. 13, 1966
F. HAUSER
3,291,922
SEQUENTIAL TIMING DEVICE WITH TIMING MOVEMENT
INDEPENDENT FROM POWER SHAFT
Filed Aug. 6, 1963
4 Sheets-Sheet 2
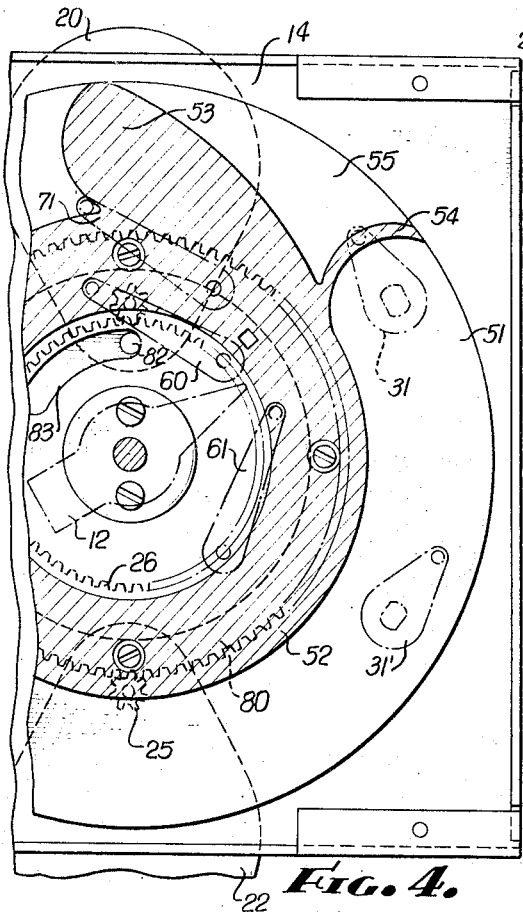
FIG. 4.
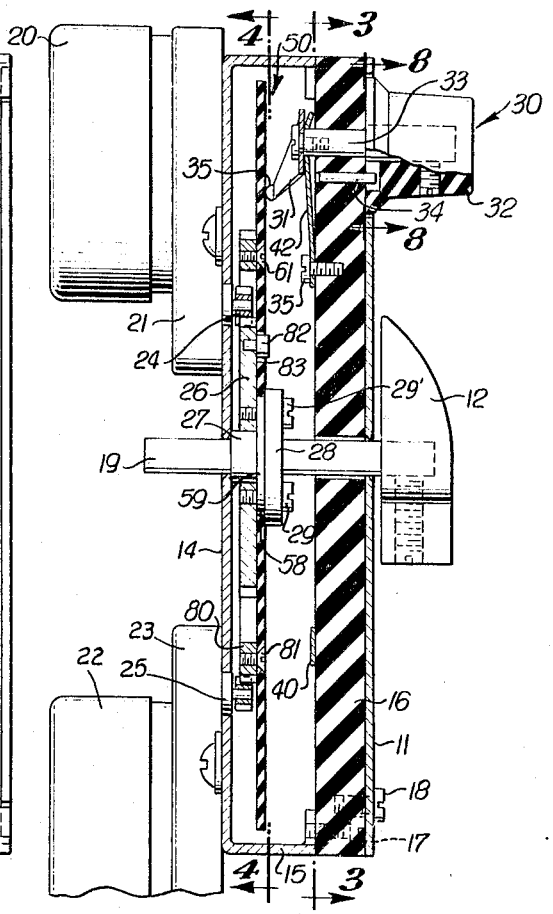
FIG. 2.
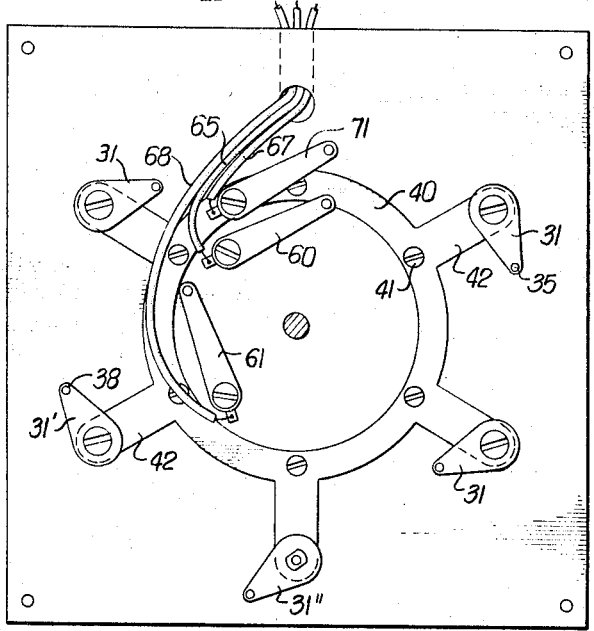
FIG. 3.
FIG. 8.
INVENTOR.
FRED HAUSER
BY
ATTORNEY.

Dec. 13, 1966   F. HAUSER   3,291,922
SEQUENTIAL TIMING DEVICE WITH TIMING MOVEMENT
INDEPENDENT FROM POWER SHAFT
Filed Aug. 6, 1963   4 Sheets-Sheet 3

INVENTOR.
FRED HAUSER
BY
ATTORNEY.

Dec. 13, 1966 F. HAUSER 3,291,922
SEQUENTIAL TIMING DEVICE WITH TIMING MOVEMENT
INDEPENDENT FROM POWER SHAFT
Filed Aug. 6, 1963 4 Sheets-Sheet 4

INVENTOR.
FRED HAUSER
BY

ATTORNEY.

United States Patent Office 3,291,922
Patented Dec. 13, 1966

3,291,922
SEQUENTIAL TIMING DEVICE WITH TIMING MOVEMENT INDEPENDENT FROM POWER SHAFT
Fred Hauser, 1544 Midvale Ave., Los Angeles, Calif.
Filed Aug. 6, 1963, Ser. No. 300,371
15 Claims. (Cl. 200—37)

This application is a continuation-in-part of my co-pending applications entitled "Timing Devices," Serial No. 232,477, filed October 23, 1962, now Patent No. 3,244,912, and "Timing Devices," Serial No. 185,637, filed April 6, 1962, now Patent No. 3,227,821.

This invention relates in general to timing devices employed in operating multiple station control devices such as electrical distributors and water pilot valves, in which the timing device is provided with a plurality of timing units independently operable to operate the control device in a pre-selected sequence, the time intervals of separate operations in the sequence being independently determinable without affecting the timing interval of any of the other operations in the sequence. More particularly, the present invention relates to an improvement in such timing devices wherein the control device is sequentially indexed to successive stations between timing periods and is allowed to dwell or remain inactive at given station settings during timing periods.

Timing devices of the general nature in which I have made an improvement may be employed for sequentially timing multiple station control apparatus, such devices being disclosed in my Patents Nos. 3,040,227 and 3,040,228 issued June 19, 1962. The timing device disclosed in my Patent No. 3,040,227 is provided with a plurality of stationary timing units disposed in a generally circular orbital array, one for each station of the control apparatus being operated. Means are provided for orbitally moving an indexing part or timing cam to register successively with the various orbitally disposed stationary timing units. Driving means propel the timing cam between the stations at selectable rates of speed. Each timing unit is provided with a projectable timing part and means associated therewith for adjusting the part to selected positions of projection into the path of the indexing part or timing cam, as it is periodically brought into registry with each unit. A timing period duration is determined by the length of time required for the timing cam to contact and pass a projected timing part of an individual timing unit. The further the timing part is projected into the path of the cam, the longer the interference therebetween and the corresponding timing period continues. Upon the timing cams contacting or interfering with the timing part, the driving means are made to operate to move the timing cam at a pre-selected relatively slow orbital advance past the timing units. The timing period is ended when the cam passes the timing unit, losing contact with the projected timing part. Then, the indexing or driving means is made to advance the timing cam at a more rapid rate to the next station. An indicator scale calibrated in units of time is normally provided on each timing unit to show the setting of the projectable timing part and indicate the duration of the timing period thereby established.

In my Patent No. 3,040,228, an improvement in the aforedescribed device is made which allows greater accuracy in adjusting and determining the duration of a timing period for certain pre-selected ranges of a timing period or portion thereof.

In my copending application Serial No. 185,637 filed April 6, 1962, an improvement in the device of my Patent No. 3,040,227 is disclosed in which stationary printed electrical circuits and sliding electrical switch means are employed in novel combination with an orbitally moving timing cam and a plurality of individually adjustable timing units.

In each of these prior devices, I have employed an orbitally moving timing cam adapted to interfere with projectable portions on the stationary timing units. The duration of a timing period is determined by the length of time the timing cam interferes with a projectable portion of a timing unit. In these devices the timing cam is mounted upon a main shaft for rotation therewith. Motor means are employed to operate the shaft which in turn propels the timing cam past the stationary timing units. Therefore, in these devices, no stationary or dwell period is afforded the main shaft. Since the main shaft of my prior devices is operably connected to the control device, such as an electrical distributor or water pilot valve, the mechanism of the control device was constantly in motion under influence of the timing device.

My copending application, Serial No. 232,477, filed October 23, 1962, is directed to an improvement in the construction of the aforementioned devices wherein the accuracy of the device is not adversely affected by rough handling. In that application, circuit plate means of electrically nonconductive material are rotatably mounted below the timing units in spaced opposed relation to the timing units such that each of the wiper or contact arms of the timing units contacts the surface of the plate means. Electrically conductive circuit paths are disposed in the surface of the plate means and are contacted by the individual wiper or contact arms in a predetermined manner during rotation of the plate means below the timing units. Such circuit plate means is mounted on the main shaft of the timing device with motor means adapted to rotate the shaft and thereby the circuit plate means. Electrical circuit means are provided for selectively connecting the motor means, operating the shaft, with a source of electrical potential in response to registry of the electrically conductive paths in the rotating circuit plate means with the timing unit wiper or contact arms. The engagement of the electrical circuit paths on the circuit plate means with the individual timing unit contact arms therefore controls the rotation of the main shaft of the timing device which in turn controls the operation of an associated multiple station control device. In its operation, the timing device, through its main shaft, constantly operates the mechanism of the control device between selected rates of speed suitable for timing and indexing operations. The main shaft of the timing device and therefore the mechanism of the control device are inactive only when the timing device is at the "off" setting and not in operation.

I have found in operating multiple station control devices that in many applications it is desirable to provide a stationary aligned contact between the electrical contacts or fluid connections in the control device during a timing period. It is therefore the principal object of the present invention to disclose and provide an improvement in the timing devices of the general character herein before referred to in which the control device being operated is actuated between successive stations during indexing periods but is maintained stationary or in a dwell stage during timing periods so that stationary contacts between electrical contacts, fluid contacts, etc., employed in the control device are effected during an entire timing period.

It is another object of the present invention to disclose and provide an improvement in a timing device for use with a multiple station control device such as an electrical distributor, water pilot valve, or the like, wherein the timing device includes a main shaft to be interconnected with and operate the control device; a plurality of stationary timing units for controlling timing periods for the various stations of the control device; an electrical circuit plate disposed beneath the timing units; and means for transmitting electrical impulses to motor means in response to completion of electrical circuits in the circuit plate beneath the timing units, wherein the improvement provides for rotation of the main shaft of the timing device during indexing operations and a stationary or dwell stage for the main shaft during timing operations or periods.

It is a further object of the present invention to disclose and provide an improvement in a timing device of the general character referred to in which an electrical circuit plate or timing cam disposed beneath the timing units may continue to rotate relative to the stationary timing units to control the duration of a timing period during the timing period while the main shaft of the timing device operating a control device may dwell or remain stationary and wherein an indexing operation, the main shaft and circuit plate or timing cam means may rotate in unison to the next station and timing period in a timing sequence.

Further objects and various advantages of the present invention will be evident to one skilled in the art from a consideration of the following detailed description of exemplary embodiments of the improvement in timing devices according to my present invention. Reference will be made to the appended sheets of drawings in which:

FIG. 2 is a vertical section of the timing device of FIG. 1 taken therein along the plane 2—2;

FIG. 3 is a plan view of the underside of an intermediate plate portion of the timing device of FIG. 2 taken therein in the plane 3—3;

FIG. 4 is a plan view of a portion of the electrical circuit plate means of the device of FIG. 2 taken therein in the plane 4—4;

Figure 5:
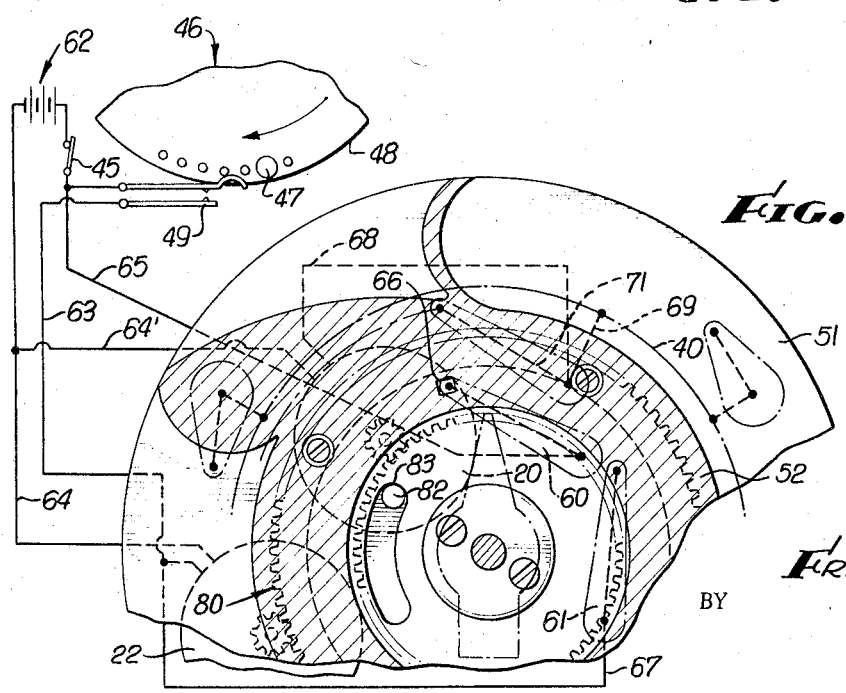
FIG. 5 is an electro-mechanical schematic illustration of the exemplary embodiment of FIGS. 1 through 4.
Figure 6:
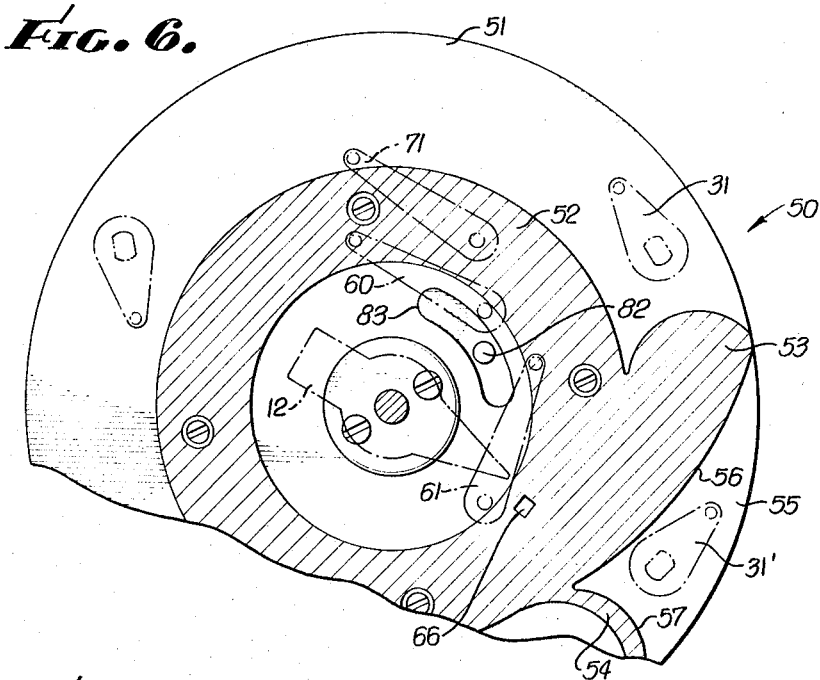
Figure 7:
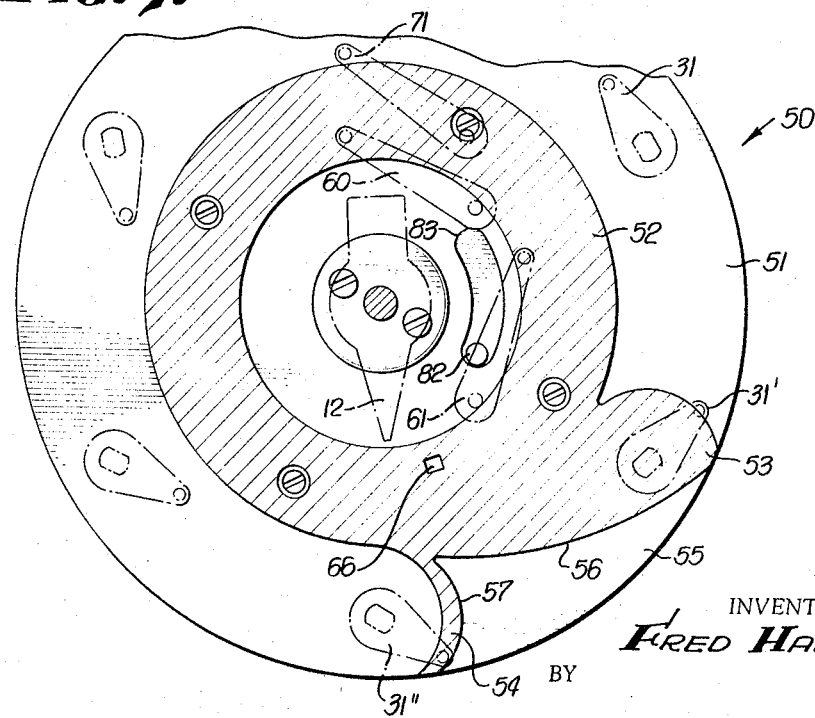
Figure 10:
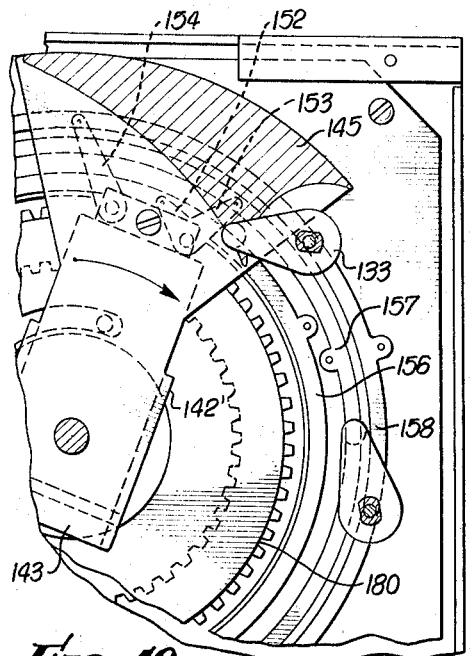
Figure 9:
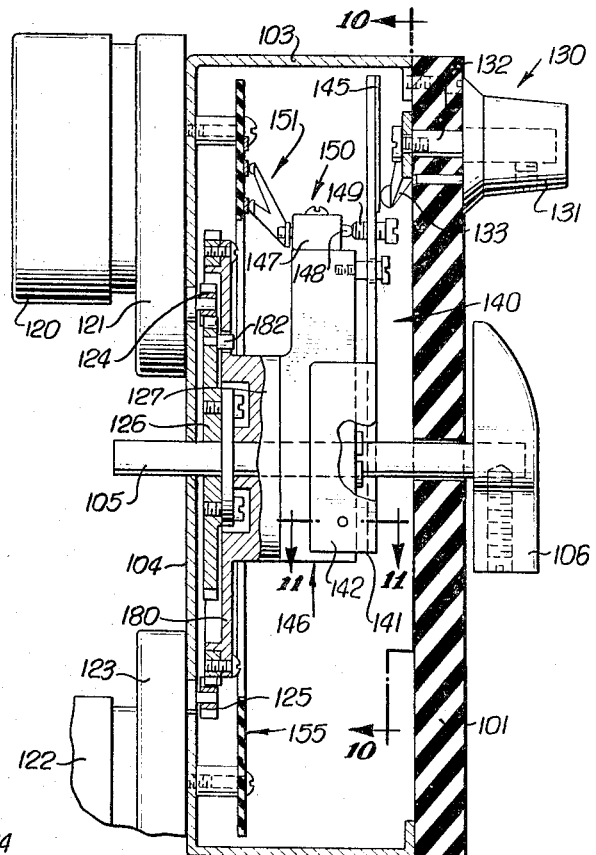
Figure 11:
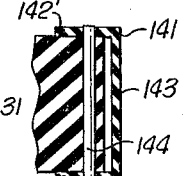
Figure 12:
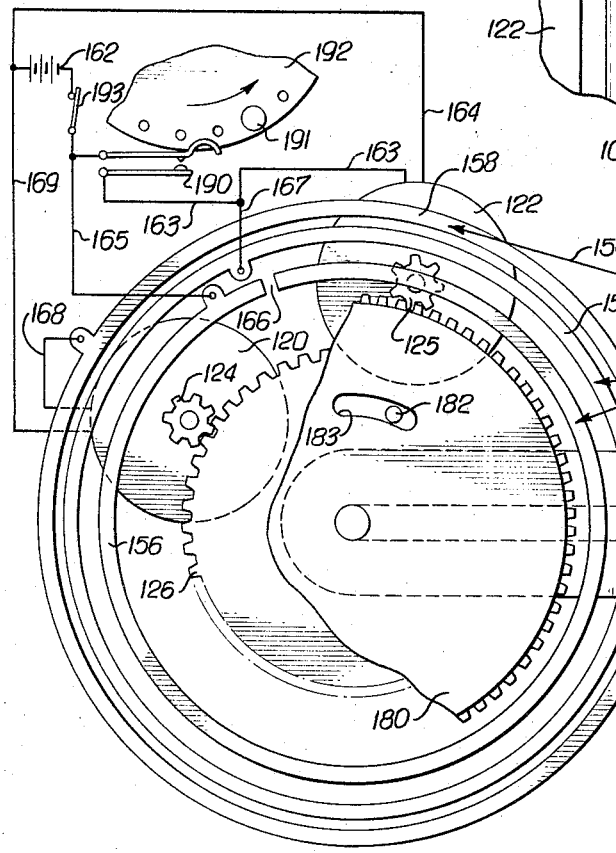

FIG. 6 is a plan view of the electrical circuit plate means of the device of FIGS. 1 through 5 when the timing period for the second station is approximately one-half completed; and FIG. 7 shows the electrical circuit plate means of FIG. 6 after the completion of the timing period for the second station and the circuit plate has been rotated into the position it assumes at the beginning of the third station timing period;

FIG. 8 is a detail view of a timing unit knob of FIG. 2 taken therein along the plane 8—8;

FIG. 9 is a vertical section of an alternative exemplary embodiment of the timing device employing the improvements according to my present invention;

FIG. 10 is a plan view of the device of FIG. 9 taken therein along the plane 10—10;

FIG. 11 is a detail view of a portion of the device of FIG. 9 taken therein along the plane 11—11; and FIG. 12 is an electro-mechanical schematic representation of the alternative exemplary embodiment of FIGS. 9 through 11.

Figure 1:
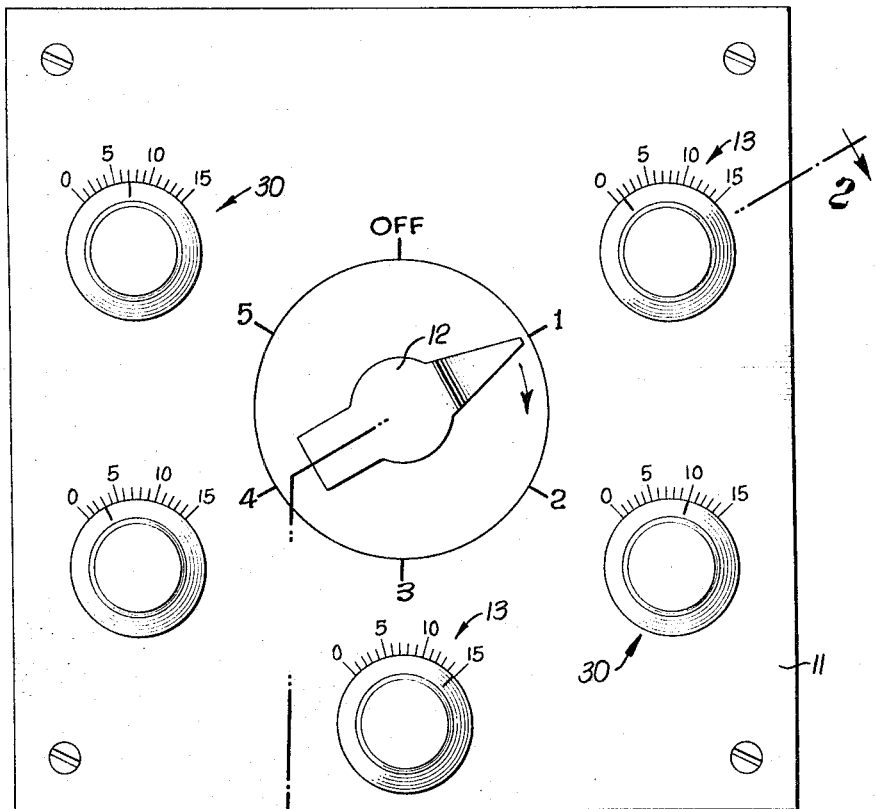
FIG. 1 is a frontal elevation of an exemplary embodiment of the timing device employing the improvements according to my present invention.

Referring now to the drawings, particularly FIGS. 1 and 2, the front plate 11 of an exemplary embodiment of the timing device according to the present invention is shown with the markings 1 through 5 to indicate the various stations of the associated control device to be operated by the timing device, as well as an "off" station. A plurality of individual stationary timing units, indicated generally at 30, are disposed in a generally circular array about the front plate 11, each timing unit being associated with one of the stations 1 through 5. As shown in the exemplary embodiment of FIGS. 1 through 8, particularly FIG. 2, each timing unit, indicated generally at 30, includes an electrically conductive wiper or contact arm 31 mounted from the intermediate plate 16 to engage a rotatable circuit plate on engagement means, indicated generally at 50. Each such arm 31 is an adjustable portion of the timing unit which is provided with means for mounting the arm for movement into various positions of adjustment. As seen in FIG. 2, timing unit knob 32 is mounted in the intermediate plate 16 by means of a timing unit shaft 33 connected to the wiper arm 31. A stop or limit peg 34 as shown in FIG. 8 limits rotative movement of the knob 32 relative to the scale 13 and limits rotation of arm 31 to arcuate movement over the circuit plate means. The timing unit shaft 33 is made of electrically non-conductive material.

As seen in FIG. 3, an electrically conductive contact ring 40 is provided on the underside of the plate 16 and may be secured there by screws 41. A plurality of projections 42, one for each wiper or contact arm 31, are provided which are slightly elevated and biased away from the plate 16, as shown in FIG. 2. The large ends of the wiper arms, as best seen in FIG. 3, are at all times in electrical contact with the contact plate or ring 40, through sliding engagement between each of the wiper arms 31 and biased projections 42. Contact points 35, may be provided in the narrow ends of the wiper or contact arms 31, as shown in FIG. 3, to engage the circuit plate means, indicated generally at 50, as shown in FIG. 2.

Engagement means for engaging the adjustable portions or arms 31 of the timing units are provided in the exemplary embodiment of FIGS. 1 through 8 on rotating plate means as indicated generally at 50. The plate means is of electrically non-conductive material and has electrically conductive circuit paths disposed in a surface thereof as indicated generally in FIGS. 2, 4, 5, 6 and 7. Plate 51 may be of any configuration, but is preferably of round shape having a diameter less than the width or height of the plate 16 but larger than the diameter of the circle on which the timing units are laid out. As best shown in FIGS. 6 and 7, plate 51 is provided with electrically conductive path means in the surfaces thereof opposing the timing units 30 and wiper arm 31, shown in phantom line. Such electrically conductive path means includes a continuous ring path 52 and radially outwardly projecting path portions 53 and 54. Path portions 53 and 54 form a non-conductive portion 55, therebetween, defined by the curvilinear edges 56 and 57. The non-conductive portion 55 may serve as an engagement means to sequentially engage the adjustable portions or wiper arms 31 to control timing periods by the engagement of the arms 31 relative to portion 55. By proper provision of electrical circuit means, as hereinafter explained, a timing period of any given station may be determined by the configuration of the non-conductive portion 55 and the adjustment of the wiper arm 31 for the timing unit of the given station. A timing motor may be continually operated with an overrunning indexing motor being activated by contact between the wiper arm 31 and the conductive portions 53 and 54. The timing period determined by the operation of the timing motor only may thus be determined by the length of time the associated wiper arm 31 lies in the non-conductive portion 55 during which the indexing motor is inactive.

In my prior copending application Serial No. 232,477 filed October 23, 1962, the plate means of electrically non-conductive material having electrically conductive circuit paths, or circuit plate, was mounted within the timing device on the main shaft for rotation relative to the timing units with rotations of the main shaft. Concurrent rotation of both the circuit plate and main shaft was required and consequent rotation or operation of the control device mechanism occurred with any rotation of the circuit plate. In the present application, it is desired that the power transmission means, shaft 19 in the exemplary embodiment, operate the control device only during indexing between stations and that stationary or dwell periods for the main shaft 19 exist during timing periods. According to the present invention, the circuit plate, indicated generally at 50, is mounted for rotation about the power transmission main shaft 19, rather than rotation with it. Means are provided for rotating the circuit plate independently of the main shaft 19 during timing periods and for rotating the shaft and circuit plate together during indexing periods as hereinafter explained.

Mounting means for rotatably mounting the engaging means including the circuit plate, indicated generally at 50, independently of the shaft 19 in spaced opposed relation to the timing units, indicated generally at 30, is provided. In the preferred embodiment shown in FIG. 2, such means includes a bushing or support member 27 fixedly mounted upon shaft 19 with one end thereof abutting against the rear plate 14. The circuit plate, indicated generally at 50, is mounted about an enlarged flange or head portion 28 of the bushing or mounting member 27. A loose or sliding fit is provided between a central aperture 58 of the circuit plate and a recess portion 59 on the flange 28 of the mounting member so that relative movement between the circuit plate and its mounting member may be obtained.

Indexing drive means are provided for driving the main shaft 19 in response to contact between a wiper arm 31 and the conductive portions 53 and 54 of the circuit plate during indexing of shaft 19 between stations. In the exemplary embodiment, such indexing drive means include an indexing motor 20, an indexing drive gear 26 and force transmitting means for driving the gear 26 and shaft 19 by the indexing motor 20. As shown in FIG. 2, motor 20 is provided with an overrunning clutch means 21 through which a pinion 24 is driven. Pinion 24 is adapted to drive the indexing drive gear 26 which in turn is mounted upon the bushing or mounting member 27 to drive the main shaft 19. Indexing drive gear 26 may be fixedly mounted upon the main shaft 19 by provision of fastening means 29, 29′ securing the gear 26 to the mounting means 27.

Timing drive means for driving the circuit plate independently of the main shaft 19 during a timing period are also provided. In the exemplary embodiment, such timing drive means includes the timing motor 22, a timing gear 80 and force transmitting means for driving the timing gear including an overrunning clutch means 23 and a pinion gear 25. As shown in FIG. 2, timing motor 22 is adapted to drive the pinion 25 through the overrunning clutch means 23. Pinion 25 in turn is adapted to drive the gear 80 which is securely fastened to a face of the circuit plate, indicated generally at 50, by means of fasteners 81. Operation of the timing motor may thus cause rotation of the circuit plate independently of the shaft 19, leaving shaft 19 stationary.

The provision of the overrunning clutch means 21 and 23 allows manual rotation of the circuit plate 51 by the knob 12 at any time, whether the motors 20 and 22 are running or not.

Connecting means are provided between the indexing drive means and the circuit plate for driving the circuit plate by the indexing means during indexing operations and allowing limited movement of the circuit plate independently of the indexing means and the shaft, the shaft then being in a stationary or dwell state, during timing periods. In the exemplary embodiment, a lost motion connection is provided between the indexing drive gear 26 and the circuit plate 51. The exemplary lost motion connection means provided is comprised of the pin 82 mounted in the indexing gear 26 and an elongated arcuate port 83 in the circuit plate.

During a timing period, the circuit plate 51 may rotate under the influence of the timing drive means independently of the indexing means and shaft 19. As best seen in FIG. 6, during a timing period the pin 82 of the exemplary connecting means moves freely within the elongated port 83 in the circuit plate 51. The length of the port 83 provided in circuit plate 51 is determined by the length of travel required by the circuit plate to rotate entirely through a maximum timing period for any given station. When a particular timing period is ended and the indexing drive means is activated, the rotation of shaft 19 and the indexing drive gear 26 will bring the pin 82 into contact with an end wall of the port 83, as shown in FIG. 7. Circuit plate 51 is thereby required to rotate together with the main shaft 19 and indexing drive gear 26 during an indexing operation.

Due to the rotation of the circuit plate 51 and the timing gear 80 at indexing speed said timing gear is therefore "over-driving" the pinion 25 mounted on the timing motor shaft. This is possible because of the overrunning clutch means 23 in the timing motor.

The functioning of the present exemplary embodiment of timing device of FIGS. 1 through 8, as well as the electrical circuit means employed, will now be described with particular reference to FIGS. 4, 5, 6 and 7, the wiper arm 31 being represented in dotted lines. Referring first to FIG. 5, the exemplary device is shown in the "off" position wherein the pointer knob 12 (shown in phantom line) is pointing to the "off" position of FIG. 1. An "off-on" switch is shown at 45 and portions of a conventional 24-hour timer are shown at 46 with a timing pin 47 on the timing disc 48. Switch 49, shown in open position, is closed by the passage of the timing pin 47.

Electrical circuit means are provided for selectively connecting each of the motors 20 and 22 of the present device with a source of electrical potential in response to registry or engagement of the electrically conductive paths of the circuit plate means with the individual wiper arms of the timing units. Such electrical circuit means may include a first or timing circuit means adapted to operate the timing motor 22 continuously during the operation of the device and a second for indexing circuit means for operating the indexing motor 20 between timing periods to rapidly index the main shaft 19 and the mechanisms of the control device between stations. There is also a starting circuit as next described.

In starting the device, as when the pin 47 of the timer, indicated at 46, closes switch 49, current flows from the source of electric potential indicated at 62 through a manual "off-on" switch 45, through the temporarily closed switch 49, through lead line 63 to motor 22 and back through lead line 64 to the source of electric potential 62, comprising the starting circuit. After the device is started, however, the timer indicated at 46 opens switch 49 by the passing of timing pin 47 beyond the switch 49. Initially, the timing circuit is not completed because the lead line 65 from the source of electrical potential at 62, runs to a first stationary wiper blade 60, which in the off position, rests upon an insulated spot 66 in the disc 51. After the circuit plate or disc 51 has been slightly rotated by the timing motor 22, while the starting circuit is closed, the timing circuit is completed by the movement of the insulated spot 66 from beneath the stationary wiper blade 60 causing an electrical contact between the blade 60 and conductive ring circuit path 52.

The first or timing circuit means for operating the timing motor 22 during a timing period may include the continuous ring circuit path 52; a pair of stationary wiper blades 60 and 61, mounted on the intermediate plate 16 as shown in FIG. 3; and the lead lines 65 and 67 interconnecting the stationary wiper blade with the source of electric potential at 62. After initial movement of the circuit plate 51 by the closing of the starting circuit, current may flow from the source of electric potential at 62 through switch 45; through lead line 65 to the blade 60; from blade 60 through the ring path 52 to the second stationary wiper blade 61; from blade 61 through lead line 67 to the timing motor 22; and from motor 22 through the lead line 64 back to the source of electric potential, indicated at 62. This first or timing circuit means is normally closed during operation of the timing device and serves to rotate the plate means independently of the indexing drive means and the main shaft 19 during timing periods when the pin 82 of the exemplary connecting means between the indexing guide means and the circuit plate lies somewhere between the end walls of the elongated aperture 83 in the timing drive gear 26, as shown in FIG. 6.

Second or indexing circuit means are provided for operating the circuit plate 51 through rotation of the main shaft 19 during indexing operations between the "off" station through stations 1 through 5. Such means in the exemplary embodiment include a lead line 64' running from the indexing motor 20 to the source of electric potential indicated at 62; a lead line 68 running from the indexing motor 20 to a third stationary blade 71 and another lead line 69 running from blade 71 to contact ring 40; any of the wiper arms 31 contacting projecting portions 53 and 54; the contact blade 60; and lead line 65. Lead line 69, in FIG. 5, interconnects the ring 40 with the third stationary wiper blade 71 mounted on the intermediate plate 16. On starting the timing device after removal of the insulated spot 66 from beneath the contact blade 60, a starting indexing circuit is completed through lead line 65, blade 60, ring path 52, blade 71, lead line 68, indexing motor 20 and lead line 64' back to the source of electric potential 62. Current flows through the second or indexing circuit means when one of the wiper arms 31 or blade 71, as best seen in FIG. 4, contacts the electrically conductive projecting path portions 53 and 54 and the switch 45 is closed.

By the closing of switch 49, on starting of the present timing device as previously explained, the timing drive motor 22 initially moves the circuit plate 51 removing the insulated spot 66 from beneath the stationary contact blade 60. The indexing motor 22 is then activated by the completion of the indexing drive circuit through the contact arm or blade 71. Completion of the indexing drive circuit as aforedescribed, actuates the indexing drive motor 22 which in turn propels the shaft 19, indexing drive gear 26 and consequently the circuit plate 51 through the pin 82 and port 83 of the exemplary connection means as shown in FIG. 5. Circuit plate 51 is thus driven by the indexing means through the connecting means into the position shown in FIG. 4 wherein the wiper arm 31 for the first station is about to engage the non-conductive portion 55 of the circuit plate 51 causing the initiation of the first timing period. When the wiper arm 31 for the first station, as shown in FIG. 4, moves on to the non-conductive portion 55, as shown in FIG. 6, the indexing drive motor and thus the indexing drive means is made inoperative and rotation of the main shaft 19 ceases. However, the timing drive circuit is at all times completed after starting of the timing device and the timing drive motor, and consequently the timing drive means, continue to operate to rotate the circuit plate 51 independently of the shaft 19. As shown in FIG. 6, continued operation of the timing drive motor 22 rotates the circuit plate 51 relative to the then stationary pin 82 and indexing drive gear 26. FIG. 6 shows the circuit plate 51 and the pin 82 in the relative positions they occupy when the main shaft 19 has been indexed to the second station and the timing period for the second station is approximately one-half completed. Upon the completion of the timing period, the wiper arm 31' for the second station contacts the conductive or projecting portion 53 causing operation of the indexing guide means. Such means may then index the shaft 19, indexing drive gear 26 and pin 82 to the third station with consequent concurrent indexing of the circuit plate 51 therewith to the position shown in FIG. 7. There, the shaft 19 and circuit plate 51 are at the beginning of the timing period for the third station, as indicated by pointer knob 12 shown in dotted line. Wiper arm 31" has contacted the conductive path portion 54 to move the circuit plate conductive path portion 53 from beneath the contact or wiper arm 31' by the indexing means and to initiate the third station timing period. At this point, the indexing drive motor is deactivated and the timing drive motor and timing drive means operate the circuit plate 51 through the third station timing period, the duration of which is determined by the setting of wiper arm 31" while the main shaft 19 and pointer 12 remain in stationary position.

An alternative exemplary embodiment of a timing device embodying the present invention is shown in FIGS. 9 through 12. Referring first to FIG. 9, the stationary timing units, indicated generally at 130, are mounted on a surface plate 101. Each timing unit includes a timing part or portion 133 rotatably adjustable through stem 132 by turning the knob 131. The timing mechanism is generally disposed between the surface plate 101 and the casing 102 including a side wall 103 and back wall 104. A power transmission means, main shaft 105, is journalled within the surface plate 101 and back plate 104 as shown in FIG. 9. The positioning of the main shaft 105 is indicated by the indicator knob 106.

An alternative form of engagement means for engaging the timing parts or adjustable portions 133 of the embodiment of FIGS. 9 through 12 includes the timing lever indicated generally at 140. The timing lever is provided to cooperate with the timing units 130 to actuate flow of electrical current in a predetermined manner as subsequently described. Timing lever 140, in this exemplary embodiment, is provided with a channel-shape central portion 141 having ported side flanges 142 and 142' and a web 143. Web 143 is ported to allow the timing lever to fit freely about the main shaft 105. A pivot pin 144, extending through the side flanges 142 and 142', pivotally supports the timing lever 140 upon retainer arm means, indicated generally at 146.

A template or cam portion 145 is provided on one side of the timing lever, indicated generally at 140, and a pin 149 is provided on an opposite side as seen in FIG. 9. Pin 149 is adapted to actuate a self-closing switch means 147 upon interference between the timing cam or template 145 and the timing part 133.

Alternative electrical circuit means are provided for selectively connecting motor means, operably associated with said power transmission of shaft means, with a source of electrical potential, in response to engagement between the alternative engagement means and the timing unit portions. Such means in the alternative exemplary embodiment include time and indexing circuits, subsequently described hereinafter, and moving electrical switch means associated with the engagement means and an electrical circuit plate means associated with the timing and indexing circuits.

Moving electrical switch means, indicated generally at 150, are provided upon the retaining arm to cooperate with an electrical circuit plate means indicated generally at 155. The moving electrical switch means may include a micro switch 147 having a contact button 148 adapted to be actuated by the contact pin 149 upon pivotal movement of the timing lever, and a leaf spring assembly indicated generally at 151. Micro switch 147 is a self-opening switch which is closed when pin 149 contacts the button 148 when cam or template 145 on the timing lever interferes with a timing part 133. The leaf spring assembly, indicated generally at 151, includes a double armed leaf spring 153 including arms 152 and depending from one side of the bottom surface of micro switch 147, and a one arm leaf spring 154 depending from another side of the bottom surface of switch 147. The leaf spring assembly 151 slides on a printed circuit in the circuit plate 155, as shown in FIG. 10, making sliding contact therewith to complete electrical circuits in a predetermined manner. Such circuits are completed through the cooperation of the circuit paths in the circuit plate means, indicated generally at 155; the moving switch means, indicated generally at 150; the timing lever, indicated generally at 140; the cam portion or template 145; and the various timing units 130.

Electrical circuit means are provided on the circuit plate, indicated generally at 155 as shown in FIG. 10 and as represented in the schematic representation of the electrical wiring, circuit means and mechanical construction of the exemplary device in FIG. 12. Such means includes the circuit paths 156, 157 and 158.

Mounting means for rotatably mounting the engagement means or timing lever, indicated generally at 140, independently of the main shaft 105 in spaced opposed relation to the timing units, indicated generally at 130 is provided. In the embodiment of FIGS. 9 through 12, such means includes a mounting member 127 rotatably positioned upon main shaft 105 which mounts the retainer arm indicated at 146.

Indexing drive means are provided for driving the main shaft 105 between stations. In this exemplary embodiment, such indexing drive means include an indexing motor 120, an indexing drive gear 126 and force transmitting means for driving the gear 126 and shaft 105 by the indexing motor 120. As shown in FIG. 9, motor 120 is provided with such force transmitting means including an overriding clutch 121 by which a pinion 124 is driven. Pinion 124 is adapted to drive the indexing drive gear 126 which in turn is fixedly mounted upon the main shaft 105.

Timing drive means for driving the circuit plate independently of the main shaft 105 during a timing period are also provided. In the exemplary embodiment of FIGS. 9 through 12, such timing drive means includes the timing motor 122, a timing gear portion 180 and force transmitting means for driving the timing gear including an overriding clutch means 123 and a pinion gear 125. Pinion gear 125 is in turn adapted to drive the timing gear portion 180 which is integral with the mounting member 127 which supports the retaining arm 146 and timing lever indicated generally at 140. Operation of the timing motor may thus cause rotation of the timing lever independently of the shaft 105, leaving shaft 105 stationary.

Connecting means are provided between the indexing drive means and the timing lever mounting means for driving the timing lever or engagement means by the indexing means during indexing operations and allowing limited movement of the timing lever independently of the indexing means and shaft 105, the shaft then being in a stationary or dwell state, during timing periods. In the present exemplary embodiment, a lost motion connection is provided between the indexing drive gear 126 and the timing drive gear 180 formed integrally with the timing lever mounting means 127. The exemplary lost motion connection means provided is comprised of a pin 182 mounted in the indexing drive gear 126 and an elongated arcuate port 183 in the timing gear portion 180 of the timing lever mounting member 127. Therefore, the timing lever, indicated generally at 140, may rotate under the influence of the timing drive means during a timing period independently of the indexing means and main shaft 105 but be rotated with the main shaft 105 during indexing between stations. Referring now to FIGS. 10 and 12, when the timing lever indicated generally at 140, and shaft 105 are positioned in an "off" position, leaf spring or switch arm 152 lies on an insulated spot 166, as in the prior embodiment, and no current can flow from the source of electrical potential to either of the motors 120 or 122. Closing of switch 190 by pin 191 on the conventional timer clock 192, the off-on switch 193 being closed, starts a timing sequence allowing current flow through lead line 163 to the timing motor 122 and back through lead line 164 to the source 162. This exemplary starting circuit is completed only for a duration long enough to move the leaf spring or switch arm 152 off of the insulated spot 166. The starting circuit is thereafter broken by opening of the switch 190 upon further movement of the pin 191 past switch 190, as shown in FIG. 12.

The exemplary timing circuit is completed upon removal of the switch arm 152 from off of insulated spot 166 and in general comprises a lead line 165; a circuit path 156 provided in the circuit plate indicated generally at 155; leaf spring or switch arms 152 and 153 of the leaf spring assembly 151 of the moving switch means, indicated generally at 150; circuit path 157 provided in the circuit plate, indicated generally at 155; lead lines 167 and 163 to timing motor 122; and the lead line 164 back to the electrical potential source 162. After initial starting of the present timing device, timing motor 122, and thus the timing drive means, is constantly operated to propel the timing lever, indicated generally at 140, at a timing speed of rotation beneath the timing units, indicated generally at 130. The timing drive means is effective upon the timing lever, however, only during timing periods when the indexing drive means is not operated.

The exemplary indexing circuit comprises generally the lead line 165 from source 162; circuit path 156; leaf spring or switch arm 152; self-closing micro-switch 147; leaf arm or switch arm 154; circuit path 158 provided in the circuit plate, indicated generally at 155; lead line 168 to the indexing motor 120; and lead line 169 back to the source 162. When micro-switch 147 is closed, the indexing motor operates to index main shaft 105 and the timing lever, through the aforedescribed connecting means and timing lever support or mounting member, between timing periods. Upon interference between the cam or template member 145 of the timing lever 140 with a timing unit timing arm or part 133, micro-switch 147 is opened and the indexing motor 120 stops. Such interference between the timing part 133 and the cam or template 145 initiates a timing period, the duration of which is determined by the shape of the cam portion or template 145, as seen in FIG. 10, and the relative setting of the timing arm or part 133. During the timing period, the timing drive means propels the timing lever, through the timing gear portion 180 and the timing lever support or mounting member 127, independently of the main shaft 105. Main shaft 105 and thus the interconnected mechanisms of the controlled multiple station control device, is stationary during the timing period. On ending of a timing period, the indexing circuit is closed by closing of switch 147 and the indexing guide means rapidly propels the indexing gear and shaft 105. When pin 182 reaches the end of arcuate port 183, the indexing drive means propels the timing lever, indicated generally at 140, along with the main shaft 105 (and thus the controlled device mechanism) to the next station for the next timing period in the timing sequence.

From the foregoing description of exemplary embodiments of the improvement in timing devices, according to my present invention, it can be seen that the present invention allows the sequential timing and indexing of a control device between multiple stations wherein the control mechanism can be indexed into a full electrical or fluid connection for an entire timing period during which such mechanism is stationary and thereafter rapidly indexed to the next station and connection. Also, the duration of a timing period and operation of the timing device for any one station does not effect the duration of any other period or the operation of the device for any other station.

Having thus described preferred exemplary embodiments of the improvement in timing device according to my present invention, what I desired to claim as new and to secure by Letters Patent is:

1. In a timing device for use with a multiple station control device such as an electrical distributor, water pilot valve, or the like, wherein the timing device includes a power transmission means to be interconnected with and operate the control device; a plurality of stationary timing units for controlling timing periods for the various stations of the control device; engagement means for engaging portions of said timing units; and electrical circuit means for selectively connecting motor means with a source of electrical potential in response to engagement of said engagement means with said timing units, the provision of:

mounting means for rotatively mounting said engagement means independently of said power transmission means and in spaced opposed relation to said timing units;

indexing drive means for driving said power transmission means;

timing drive means for driving said engagement means; and connecting means between said indexing drive means and said engagement means including means for driving said engagement means with said mounting means and power transmission means by said indexing drive means during an indexing period and for allowing limited movement of said engagement means independently of said indexing means and said transmission means to be driven by said timing drive means on said mounting means during a timing period.

2. The device of claim 1 wherein:

said indexing drive means includes an indexing gear fixedly mounted on said power transmission means, an indexing motor means and means for driving said gear and transmission means by said indexing motor;

said timing drive means includes a timing gear, means fastening said gear to said engagement means for common movement, a timing motor and means for driving said timing gear by said timing motor; and said connecting means comprises means providing a lost motion connection between said indexing gear and said engagement means.

3. The device of claim 2 wherein said means providing a lost motion connection between said indexing gear and said engagement means comprises a pin mounted in said indexing gear and an elongated arcuate port in a portion of said engagement means, said pin being mounted in said indexing gear to penetrate said port.

4. In a timing device for use with a multiple station control device such as an electrical distributor, water pilot valve, or the like, wherein the timing device includes a main shaft; a plurality of stationary timing units, one for each station of the control device to be operated, each said timing unit including an electrically conductive wiper arm; and plate means of electrically non-conductive material having electrically conductive circuit paths disposed in a surface thereof, the provision of:

means for rotatively mounting said plate means in spaced opposed relation to said timing units with each said wiper arm contacting said surface of said plate means;

indexing drive means driving said shaft during an indexing period;

timing drive means driving said plate means during a timing period; and connecting means between said indexing means and said plate means allowing limited movement of said plate means independently of said indexing means and said shaft during a timing period when said plate means is driven by said timing drive means.

5. An improved timing device adapted to sequentially operate a multiple station control device such as an electrical distributor, water pilot valve, or the like, wherein the duration of a timing period for any one station does not affect that of any other station and wherein stationary settings of the control device are effected during timing periods and indexing movement between stations of the control device are effected between timing periods, said timing device comprising:

A plurality of individual timing units, one for each station of the control device, each unit including adjustable means for setting the duration of a timing period;

a main shaft to operate a multiple station control device;

indexing drive means including an indexing motor for driving said main shaft during an indexing period;

engagement means for engaging the adjustable means of said timing units;

mounting means for rotatably mounting said engagement means to rotate about and relative to said main shaft in spaced opposed relation to said timing units to engage said adjustable means of said timing units;

electrical circuit means for operating said indexing drive motor in response to engagement between portions of said engaging means and the adjustable means of the timing units, an indexing period occurring during said engagement;

timing drive means including a timing motor for driving said engagement means independently of said main shaft; and connecting means between said indexing drive means and said engagement means for driving said engagement means by said indexing drive means during indexing movement of said shaft between timing periods and for allowing movement of said engagement means by said timing drive means independently of said main shaft during timing periods.

6. The timing device of claim 5 wherein said indexing drive means also includes an indexing gear fixedly mounted on said shaft and force transmitting means for driving said gear and shaft by said indexing motor; and said connecting means comprises a lost motion connection between said indexing gear and said engagement means.

7. A timing device as in claim 5 wherein:

the adjustable means for setting the duration of a timing period includes an electrically conductive wiper arm; and said engagement means includes plate means of electrically non-conductive material with circuit paths of electrically conductive material disposed in a surface of said plate means, said plate means and circuit paths engaging said wiper arms during rotation of said engaging means.

8. The timing device of claim 7 wherein said indexing drive means also includes an indexing gear fixedly mounted on said shaft and force transmitting means for driving said gear and shaft by said indexing motor; and said connecting means comprises a pin and slot lost motion connection between said indexing gear and said plate means.

9. The timing device of claim 5 wherein:

said engagement means includes a timing lever pivotally supported on a retainer arm means and a cam portion provided on one side of said lever opposing said timing units; and said electrical circuit means includes moving electrical switch means provided on said retainer arm and stationary electrical circuit plate means contacted by said moving switch means, said switch means being actuated by engagement between said pivotally supported timing lever and said adjustable means of said timing units.

10. A timing device comprising:

a plurality of timing units, each unit including an adjustable portion for setting the duration of a timing period for said unit;

engagement means for engaging said adjustable portions including means for moving said engagement means past said timing units, the duration of engagement between said adjustable portion and said engagement means as said engagement means is moved past said timing unit depending upon the adjustment of said adjustable portion;

means for operating motor means in response to the engagement between said engagement means and said adjustable portions of said timing units;

power transmission means for operating a multiple station control device to be operated by the timing device;

indexing drive means for driving said power transmission means to index said control device between stations, said indexing drive means being connected with said motor means;

timing drive means for driving said means for moving said engagement means past said timing units independently of said power transmission means; and connecting means between said indexing drive means and said means for moving said engagement means past said timing units for indexing said engagement means with said power transmission means and control device between stations, said connecting means including means for allowing limited movement of said means for moving said engagement means independently of said indexing drive means and power transmission means during a timing period when said engagement means is driven by said timing drive means.

11. A timing device to operate a multiple station control device such as an electrical distributor, water pilot valve, or the like, through rotation of a main shaft which is characterized by the dwell of such main shaft during timing periods and the indexing rotation thereof between timing periods, said device comprising:

a main shaft to operate a multiple station control device through rotation of said shaft;

indexing drive means including motor means for rotating said main shaft in successive increments of rotation;

timing means including a plurality of adjustable timing units, an engagement means for engaging said units, a timing motor for driving said engagement means past said units, and electrical circuit means for actuating said motor means of said indexing drive means between timing periods determined by engagement between said engagement means and timing units; and connecting means between said indexing drive means and said engagement means for driving said engagement means by said indexing drive means between timing periods and for allowing said indexing drive means and main shaft to dwell independently of driving of said engagement means by said timing motor during timing periods.

12. A timing device to operate a multiple station control device such as an electrical distributor, water pilot valve, or the like, through rotation of its main shaft, characterized by the dwell of its main shaft during timing periods and the indexing rotation thereof at the end of a timing period, said device comprising:

a plurality of timing units, including adjustable means for setting the duration of a timing period;

a main shaft to operate a multiple station control device through rotation of said shaft;

engagement means and mounting means for mounting said engagement means to rotate about said shaft to bring portions of said engagement means into successive engagement with said timing units on an indexing rotation of said shaft;

indexing drive means including motor means for rotating said shaft to index said shaft and engagement means between successive timing units; and means for connecting said indexing drive means and engagement means for driving said engagement means by said indexing means with said shaft on indexing rotation of said shaft and for allowing rotation of said engagement means independently of said shaft and indexing means during a timing period, said shaft being stationary during said timing period.

13. The timing device of claim 12 including timing motor means for driving said engagement means during a timing period, said timing motor means being rendered operative by said engagement between portions of said engagement means and one of said timing units.

14. The timing device of claim 13 including electrical means operated by said timing motor and connected to said timing units to actuate said indexing drive means at the end of a timing period determined by said adjustment of said timing unit.

15. A timing device to operate a multiple station control device such as an electrical distributor, water pilot valve, or the like, through rotation of its main shaft comprising:

a main shaft to operate a multiple station control device through rotation of said shaft;

indexing drive means for rotating said main shaft; and timing means including a plurality of adjustable timing units, and engagement means rotatable into successive engagement with said units, a timing motor and electrical circuit means for operating said indexing drive means between timing periods, said timing periods being determined by the adjustment of said timing units engaged by said engagement means; and connecting means between said indexing drive means and said engagement means allowing said indexing drive means and main shaft to dwell independently of driving of said engagement means by said timing motor during timing periods.

References Cited by the Examiner
UNITED STATES PATENTS

| 2,288,019 | 6/1942 | Newman et al. | 318—443 X |
| 3,040,227 | 6/1962 | Hauser | 200—38 |
| 3,040,228 | 6/1962 | Hauser | 318—5 X |
| 3,151,489 | 10/1964 | Bowen | 200—38 X |
| 3,227,821 | 1/1966 | Hauser | 200—11 |

ROBERT K. SCHAEFER, *Primary Examiner.*

KATHLEEN H. CLAFFY, W. C. GARVERT, *Assistant Examiners.*